United States Patent
Grosso et al.

(10) Patent No.: US 6,692,014 B1
(45) Date of Patent: Feb. 17, 2004

(54) LOAD HAULING TRAILER ASSEMBLY ADAPTED FOR ON AND OFF ROAD USE

(75) Inventors: Robert M. Grosso, Lakewood, CO (US); Joseph J. Martin, Edgewater, CO (US); Chip Webster, Boulder, CO (US)

(73) Assignee: Adventure Sports Products, Lakewood, CO (US)

( * ) Notice: Subject to any disclaimer, the term of this patent is extended or adjusted under 35 U.S.C. 154(b) by 0 days.

(21) Appl. No.: 10/062,041

(22) Filed: Jan. 31, 2002

(51) Int. Cl.[7] .................................................. B60D 1/00
(52) U.S. Cl. ............................ 280/491.1; 280/124.166; 280/124.169
(58) Field of Search .......................... 280/491.1, 491.3, 280/124.169, 124.166, 43; 267/277

(56) References Cited

U.S. PATENT DOCUMENTS

| | | | |
|---|---|---|---|
| 1,658,500 A | 2/1928 | Tewes | |
| 1,899,900 A | 2/1933 | Nelson | |
| 2,157,186 A | 5/1939 | Pinter, Sr. et al. | 9/2 |
| 2,489,705 A | 11/1949 | Du Brie | 9/1 |
| 2,501,750 A | 3/1950 | Warner | 280/44 |
| 2,659,464 A | 11/1953 | Sweetman | 190/1 |
| 2,893,019 A | 7/1959 | Renfroe et al. | 9/1 |
| 3,009,173 A | 11/1961 | Angell | 9/1 |
| 3,143,749 A | 8/1964 | Buchholz et al. | 9/1 |
| 3,436,773 A | 4/1969 | Richardson | 9/1 |
| 3,618,149 A | 11/1971 | Christensen | 9/1 T |
| 3,689,950 A | 9/1972 | Jalowiecki et al. | 9/1 T |
| 4,165,096 A * | 8/1979 | Lewis et al. | 280/641 |
| 4,372,568 A * | 2/1983 | Campbell | 280/63 |
| 4,478,167 A | 10/1984 | Hart | 114/352 |
| 4,554,884 A | 11/1985 | Bouliane | 114/344 |
| 4,754,998 A * | 7/1988 | LeJuerrne | 296/173 |
| 4,765,642 A * | 8/1988 | Struzina | 280/656 |
| 4,790,256 A | 12/1988 | Levine | 114/352 |
| 4,841,900 A | 6/1989 | Maselko | 114/353 |
| 4,920,909 A | 5/1990 | Grassi et al. | 114/344 |
| 5,353,733 A | 10/1994 | Evans | 114/353 |
| 5,354,090 A * | 10/1994 | Grovom | 280/656 |
| 5,380,028 A * | 1/1995 | Ferris et al. | 280/405.1 |
| 5,411,287 A * | 5/1995 | Henschen | 280/124.169 |
| 5,515,805 A | 5/1996 | Johanson | 114/344 |
| 5,749,589 A * | 5/1998 | Hopkins et al. | 280/47.34 |
| 5,813,359 A | 9/1998 | Hall | 114/344 |
| 6,145,465 A | 11/2000 | Murphree | 114/353 |
| 6,164,238 A | 12/2000 | Stokes | 114/353 |
| 6,254,117 B1 * | 7/2001 | Cross | 280/401 |

* cited by examiner

*Primary Examiner*—Lesley D. Morris
*Assistant Examiner*—L. Lum
(74) *Attorney, Agent, or Firm*—Flanagan & Flanagan; John R. Flanagan (57) ABSTRACT

A load hauling trailer assembly adapted for on and off road use includes a towable mobile chassis, a storage container body mounted on the mobile chassis and having an open top, a top cover having an outer side and being mountable on the storage container body and movable between opened and closed positions relative to the open top of the storage container body, and a carrier rack mounted on the outer side of the top cover and adapted to carry gear thereon when the top cover is mounted on the storage container body and moved to the closed position. The mobile chassis includes a frame structure, a pair of wheel subassemblies, and suspension and frame structure height adjustment subassemblies mounted to and extending transversely of the frame structure and mounting the wheel subassemblies to the frame structure.

18 Claims, 9 Drawing Sheets

LOAD HAULING TRAILER ASSEMBLY ADAPTED FOR ON AND OFF ROAD USE

BACKGROUND OF THE INVENTION

1. Field of the Invention

The present invention generally relates to recreational equipment and, more particularly, is concerned with a load hauling trailer assembly adapted for on and off road use.

2. Description of the Prior Art

All-terrain vehicles (ATVs) are currently employed in a wide range of recreational as well as business uses where it is desired to be able to quickly, easily and conveniently reach remote off road designation locations which are often inaccessible to other large vehicles. Typical recreational uses include fishing, hunting and camping whereas typical business uses include fencing and building construction by farmers and ranchers.

What is currently needed to extend and enhance the utility of ATVs for both recreational and business users is a versatile trailer that can be pulled by an ATV and is capable of hauling a considerable range of recreational and work gear that will be used at the destination location.

SUMMARY OF THE INVENTION

The present invention provides a load hauling trailer assembly designed to satisfy the aforementioned need. The load hauling trailer assembly of the present invention is adapted to be pulled by an ATV, as well as other vehicles, for both on and off road use.

Accordingly, the present invention is directed to a load hauling trailer assembly which comprises: (a) a towable mobile chassis; (b) a storage container body mounted on the mobile chassis and having an open top; (c) a top cover having an outer side and being mountable on the storage container body and movable between opened and closed positions relative to the open top of the storage container body; and (d) a carrier rack mounted on the outer side of the top cover and adapted to carry gear thereon when the top cover is mounted on the storage container body and moved to the closed position.

The present invention also is directed to a load hauling trailer assembly which comprises: (a) a towable mobile chassis including a longitudinally-extending frame structure having front and rear ends and opposite lateral sides, a pair of wheel subassemblies, and means mounted to and extending transversely of the frame structure for mounting the wheel subassemblies to the frame structure intermediately between the front and rear ends and outwardly of the opposite lateral sides of the frame structure, the means for mounting the wheel subassemblies to the frame structure including a suspension subassembly adapted to absorb impacts received by the wheel assemblies and a frame structure height adjustment subassembly coupling the opposite ends of the suspension subassembly to the wheel subassemblies; (b) a storage container body mounted on the mobile chassis and having an open top; and (c) a top cover having an outer side and being mountable on the storage container body and movable between opened and closed positions relative to the open top of the storage container body.

The present invention further is directed to a load hauling trailer assembly which comprises: (a) a towable mobile chassis including a longitudinally-extending frame structure having front and rear ends and opposite lateral sides: and a pair of wheels rotatably coupled to the frame structure intermediately between the front and rear ends and outwardly of the opposite lateral sides of the frame structure; (b) a storage container body mounted on the mobile chassis and having an open top, the storage container body including a bottom wall having opposite side edges and front and rear edges, a pair of opposite side walls connected to and extending upwardly from the opposite side edges of the bottom wall, and front and rear end wall connected to and extending upwardly from the front and rear edges of the bottom wall and extending between and connected to the side walls, the bottom wall, opposite side walls and front and rear walls together defining a storage cavity in the storage container body and the open top thereof, the storage container body further including a pair of opposite wheel wells recessed into the bottom wall and opposite side walls of the storage container body, the wheels of the wheel assemblies being at least partially disposed in the wheel wells of the storage container body; and (c) a top cover having an outer side and being mountable on the storage container body and movable between opened and closed positions relative to the open top of the storage container body.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
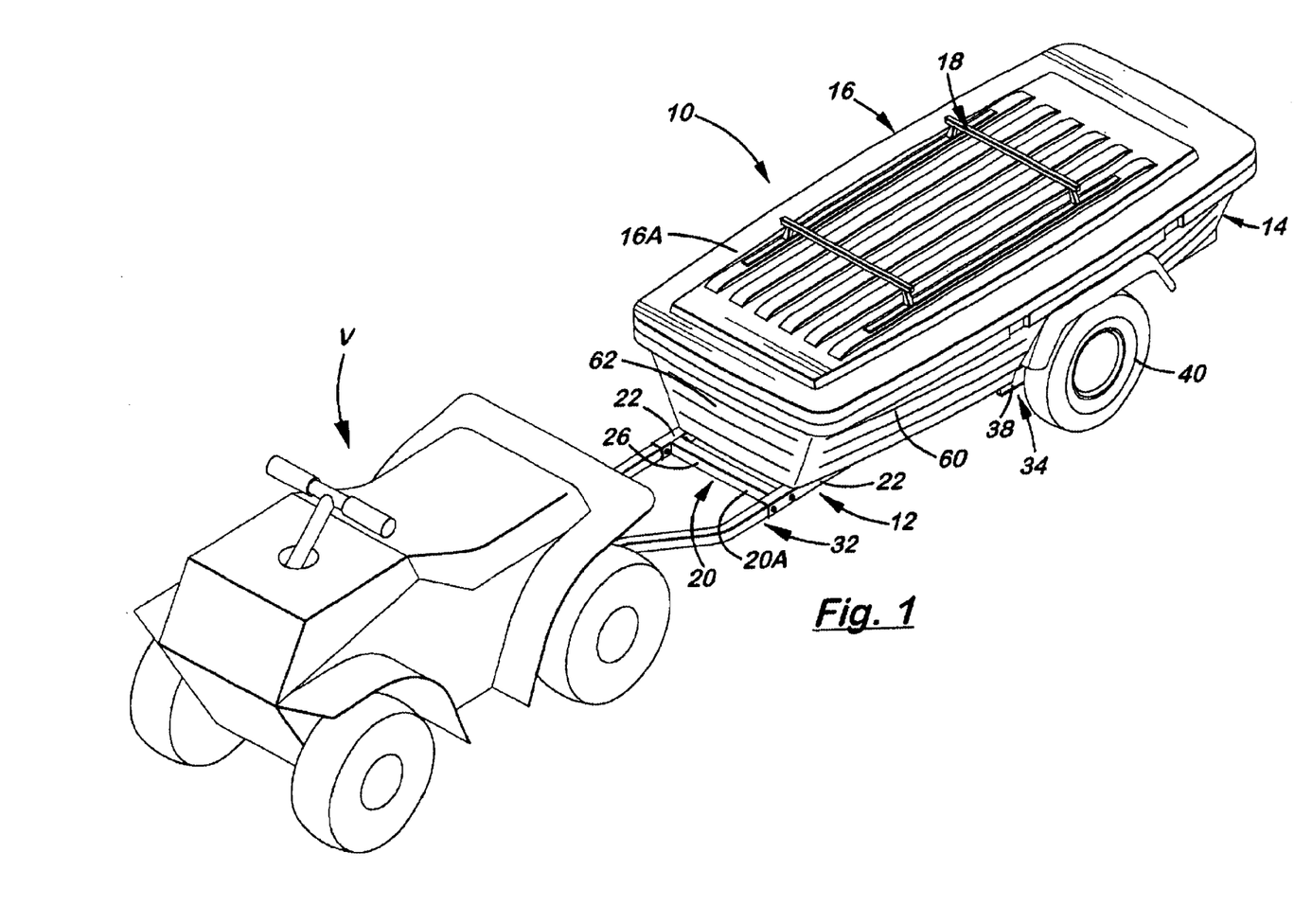
FIG. 1 is a perspective view of a load hauling trailer assembly of the present invention hitched behind an all-terrain vehicle having a towable mobile chassis, a storage container body mounted on the mobile chassis, and a top cover with a carrier rack attached thereon mounted on and closing an open top of the storage container body.
Figure 2:
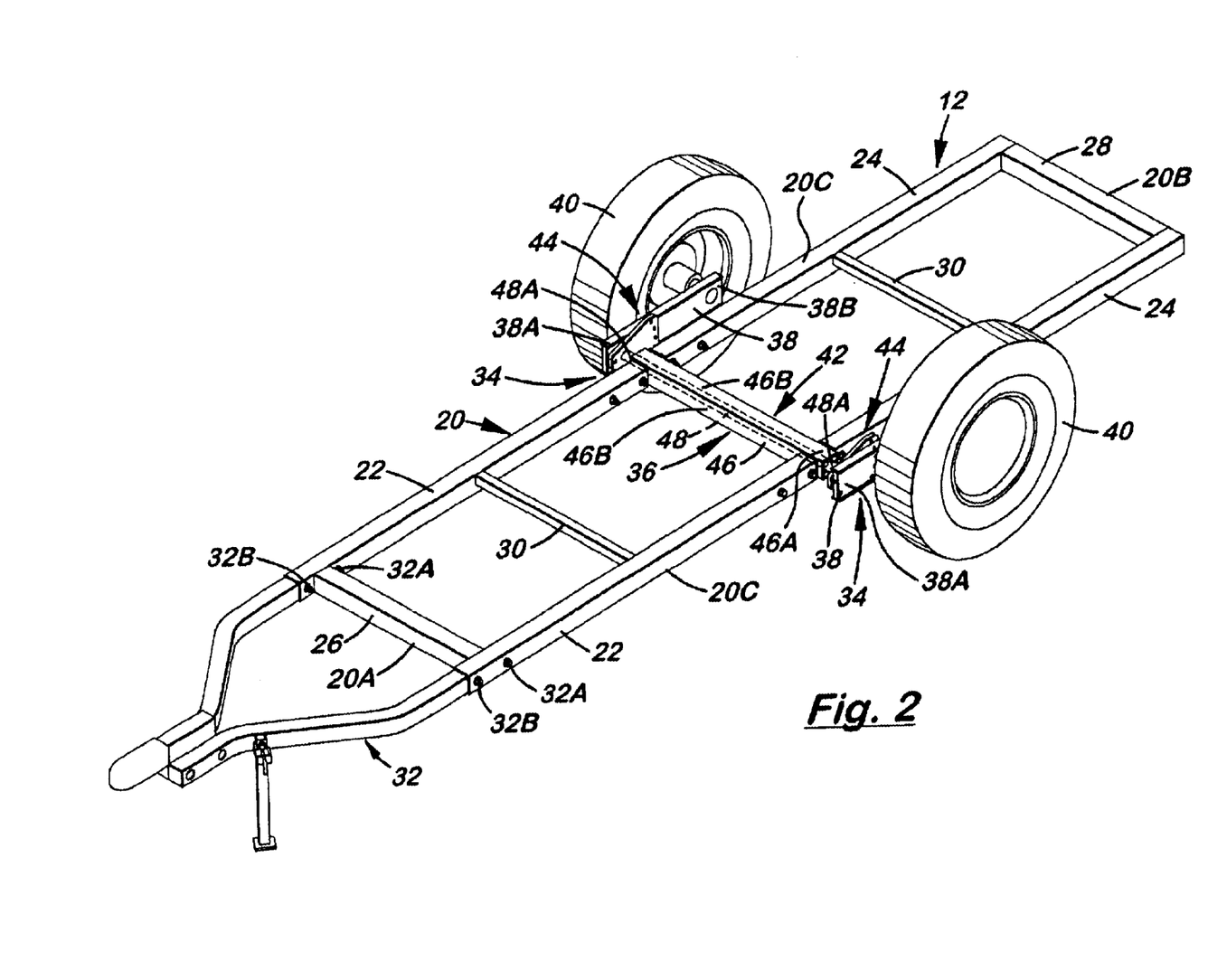
FIG. 2 is an enlarged perspective view of a mobile chassis of the trailer assembly of FIG. 1.
Figure 3:
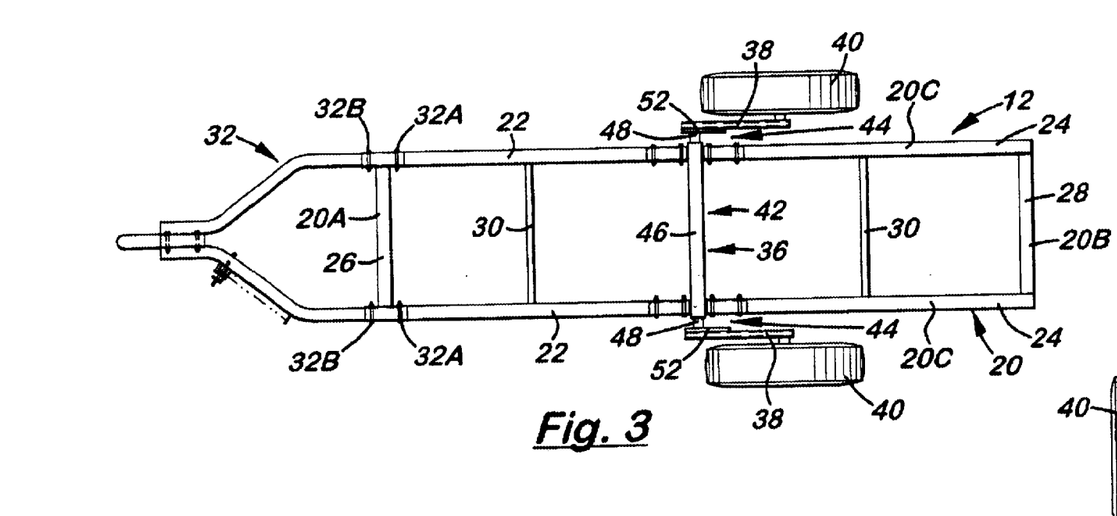
FIG. 3 is a top plan view, on a reduced scale, of the mobile chassis of FIG. 2.
Figure 4:
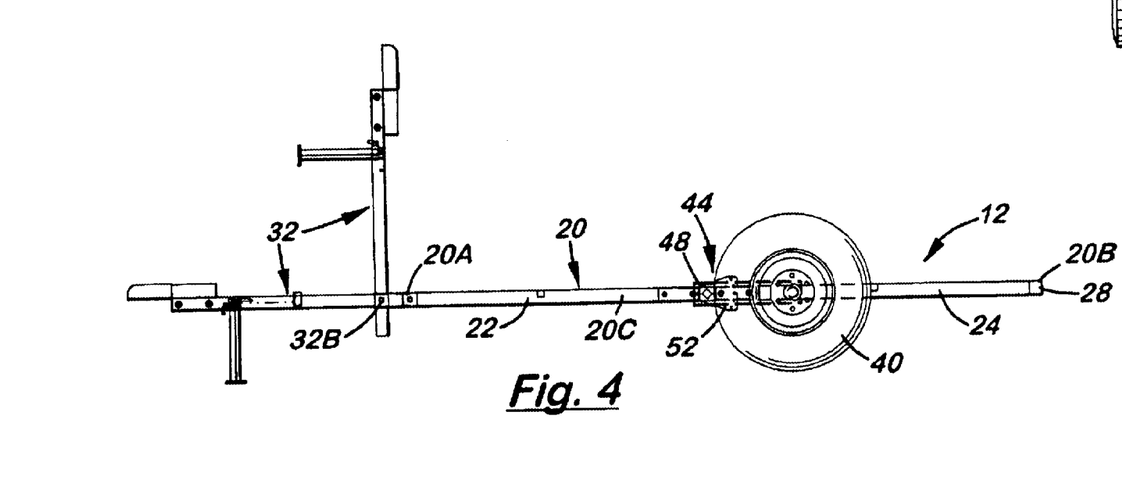
FIG. 4 is a side elevational view of the mobile chassis of FIG. 3, showing a tongue structure of the mobile chassis in a deployed position and a non-use or storage position.

Referring to the drawings and particularly to FIG. 1, there is illustrated a load hauling trailer assembly, generally designated 10, of the present invention. The trailer assembly 10 is shown hitched behind a conventional all-terrain vehicle V for pulling by the vehicle V in both on and off road use. It should be understood that the trailer assembly 10 can also be hitched to and pulled behind an ordinary car or pickup truck.

Referring to FIGS. 1–9, the trailer assembly 10 basically includes a towable mobile chassis 12, a storage container body 14, a top cover 16, and a carrier rack 18. The container body 14 is mounted upon the mobile chassis 12 by conventional types of fasteners (not shown) or any other suitable means. The container body 14 has an open top 14A. The top cover 16 has an outer side 16A and is mountable on the container body 14 and movable between opened and closed positions relative to the open top 14A of the container body 14. In FIG. 1, the top cover 16 is shown after being moved to the closed position, whereas in FIG. 6 the top cover 16 has been removed from the container body 14 such that the open top 14A thereof is fully uncovered.

Figure 14:
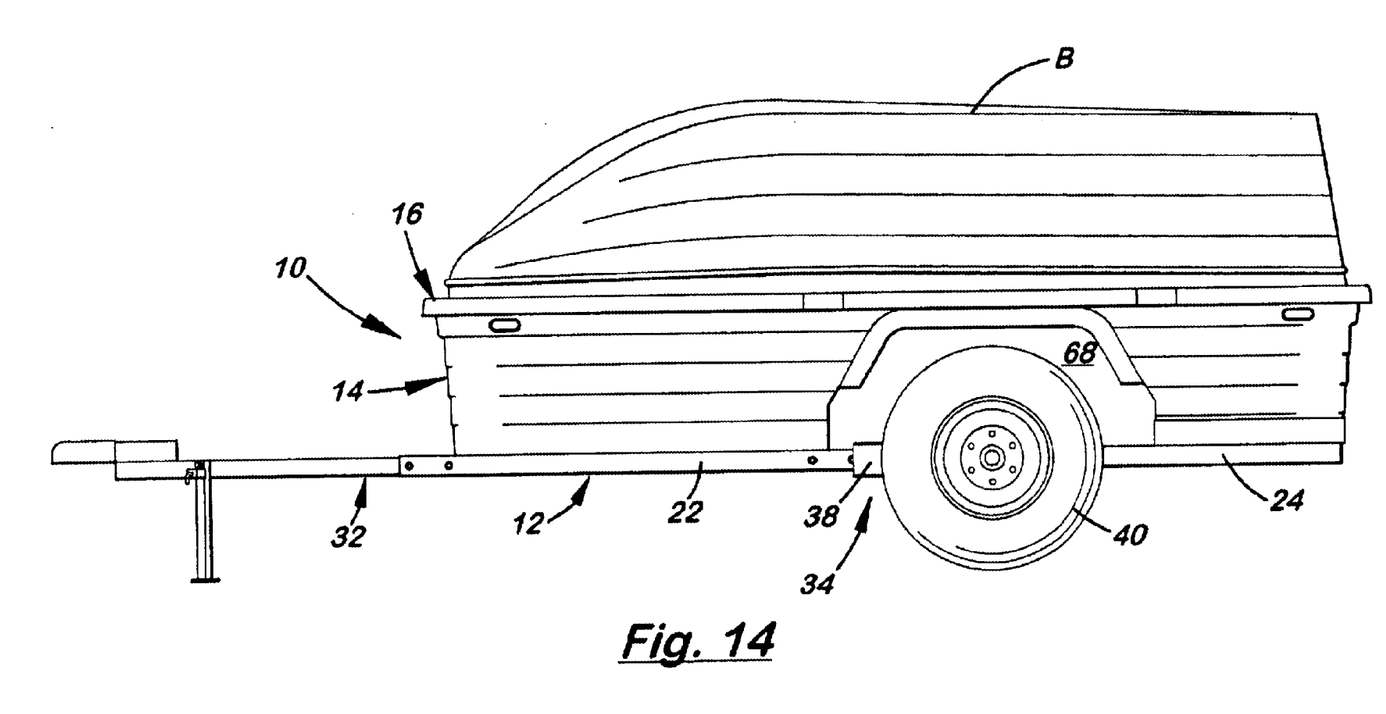
FIG. 14 is a side elevational view of the trailer assembly of FIG. 1 being shown with a boat mounted in inverted fashion on the top cover of the trailer assembly.

The carrier rack 18 is fixedly mounted on the outer side 16A of the top cover 16 and assumes a generally horizontal orientation in which the rack 18 is adapted to carry gear thereon when the top cover 16 is horizontally disposed on the storage container body 14 and moved to the closed position, as seen in FIG. 1. The carrier rack 19 particularly is adapted for hauling items such as bikes, enclosed storage rack, kayaks, canoe, surfboards, etc. The top cover 16 may also have built-in structural features adapted to haul items. For example, referring to FIG. 14, the trailer assembly 10 also can carry a boat B which can have complementary mounting structures built into it so as to fit with the built-in mounting structures on the top of the top cover 16.

More particularly, the towable mobile chassis 12 includes a longitudinally-extending frame structure 20 formed by pairs of parallel front and rear longitudinal members 22, 24 and front and rear cross members 26, 28 and middle cross members 30 extending between and interconnecting the pairs of front and rear longitudinal members 22, 24. The frame structure 20, so formed, has front and rear ends 20A, 20B and opposite lateral sides 20C.

Referring to FIGS. 2–4 and 6–8, the towable mobile chassis 12 also includes a tongue structure 32 attached to and extending forwardly from the front end 20A of the frame structure 20. The tongue structure 32 is attached to the front end 20A of the frame structure 20 so as to permit pivotal movement of the tongue structure 32 between a deployed position in which the tongue structure 32 is disposed in a generally coplanar relationship to the frame structure 20 and a storage position in which the tongue structure 32 is disposed in a generally upright transverse relationship to the frame structure 20. The tongue structure 32 is converted for moving from the horizontal deployed position to vertical storage position by removal of rear fasteners 32A such that the tongue structure 32 will then pivot about front fasteners 32B.

Referring to FIGS. 2–5, 11 and 12, the mobile chassis 12 further includes a pair of wheel subassemblies 34 and mounting means 36 mounted to and extending transversely of the frame structure 20 for mounting the wheel subassemblies 34 to the frame structure 20 intermediately between the front and rear ends 20A, 20B and outwardly of the opposite lateral sides 20C of the frame structure 20. Each of the wheel subassemblies 34 includes a swing arm 38 and a wheel 40. The swing arm 38 of each wheel assembly 34 have opposite ends 38A, 38B and is coupled at the one end 38A to the mounting means 36. The wheel 40 of each wheel assembly 34 is rotatably mounted to the other end 38B of the swing arm 38 of the wheel subassembly 34.

The mounting means 36 includes a torsion bar suspension subassembly 42 and a frame structure height adjustment subassembly 44. The torsion bar suspension subassembly is adapted to absorb impacts received by the wheels 40 of the wheel assemblies 34. The frame structure height adjustment subassembly 44 couples the opposite ends of suspension subassembly 42 to the wheel subassemblies 34.

Figure 5:
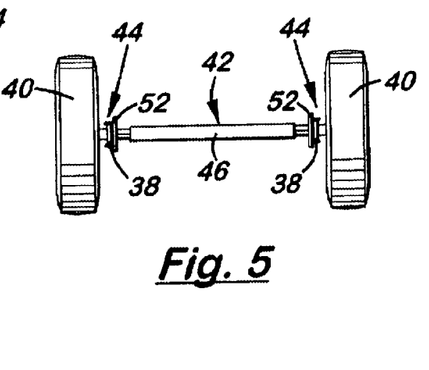
FIG. 5 is an end elevational view of a pair of wheel subassemblies and a resilient torsion bar suspension subassembly of the mobile chassis of FIG. 3 removed from an elongated frame structure of the mobile chassis.
Figure 6:
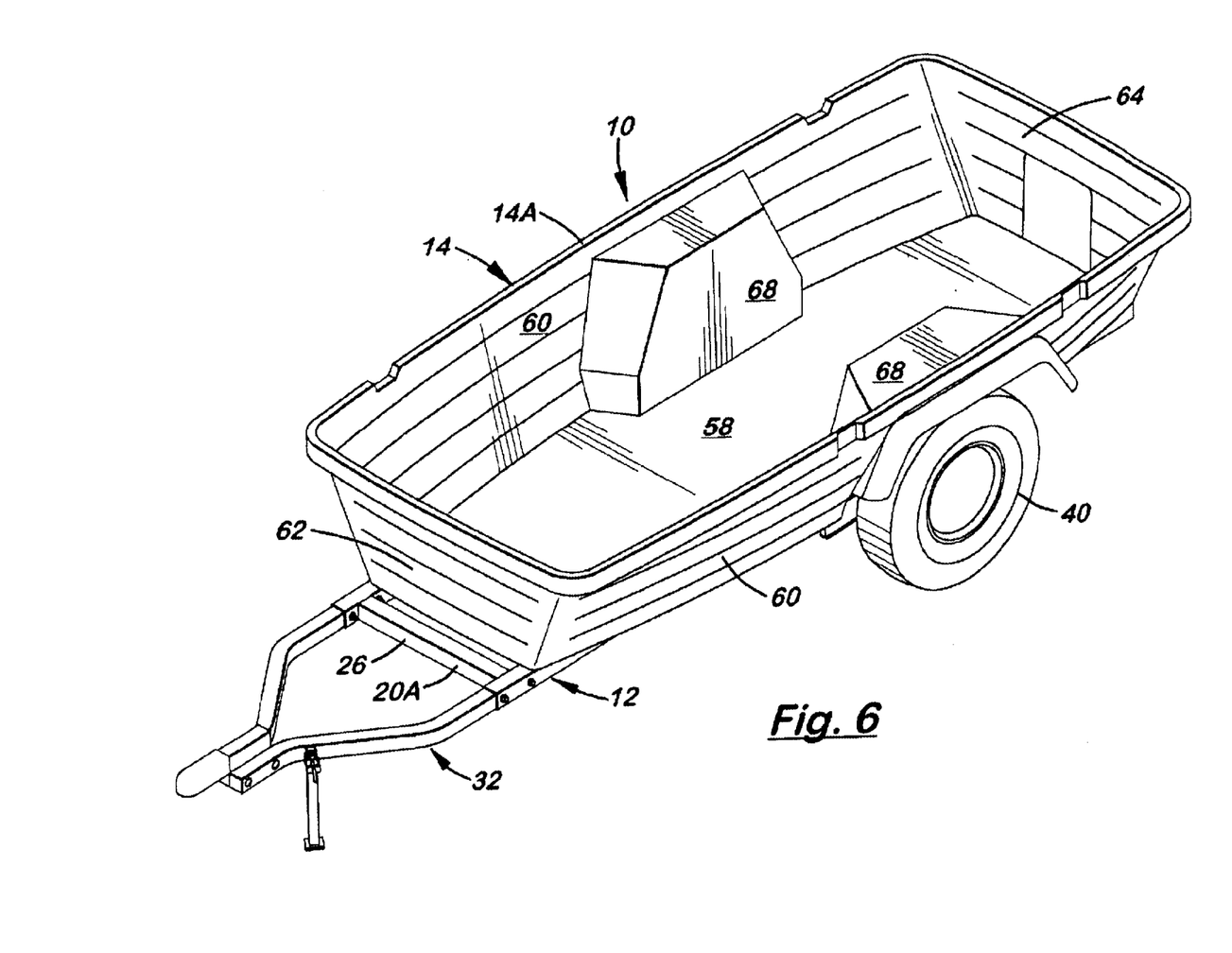
FIG. 6 is an enlarged perspective view of the trailer assembly of FIG. 1 with the top cover removed from the storage container body of the trailer assembly.
Figure 7:
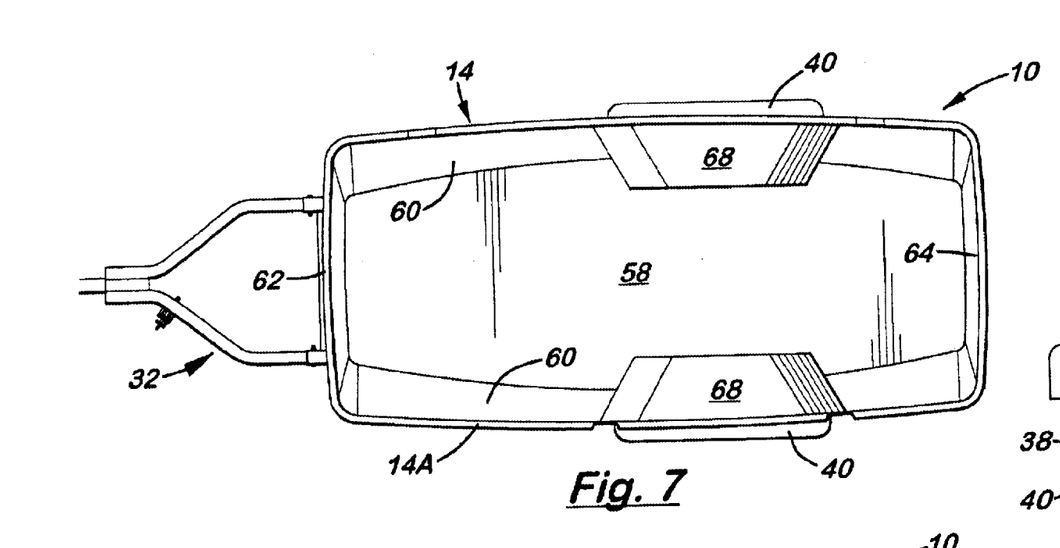
FIG. 7 is a top plan view, on a reduced scale, of the trailer assembly of FIG. 6.
Figure 8:
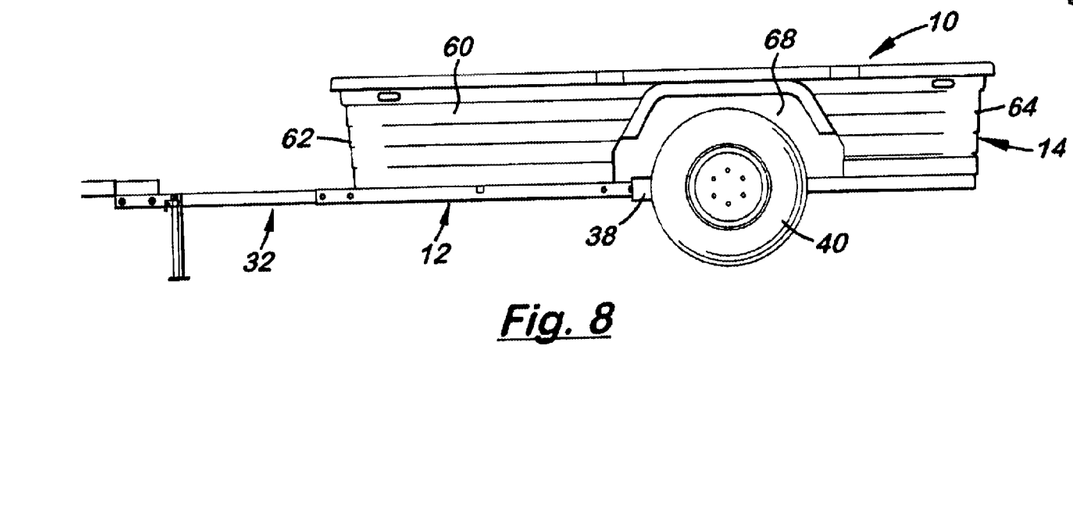
FIG. 8 is a side elevational view of the trailer assembly of FIG. 7.
Figure 9:
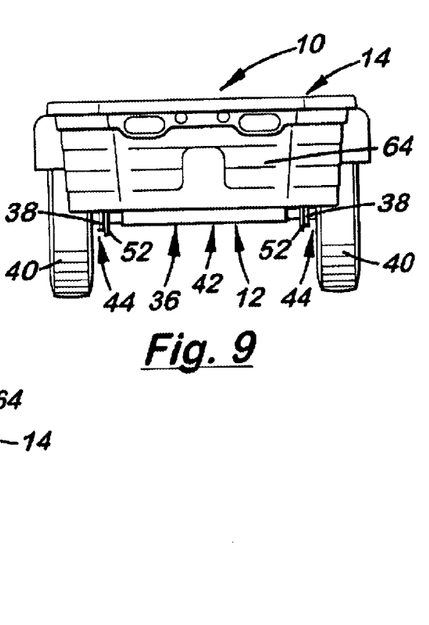
FIG. 9 is a rear end view of the trailer assembly as seen along line 9—9 of FIG. 7.
Figure 10:
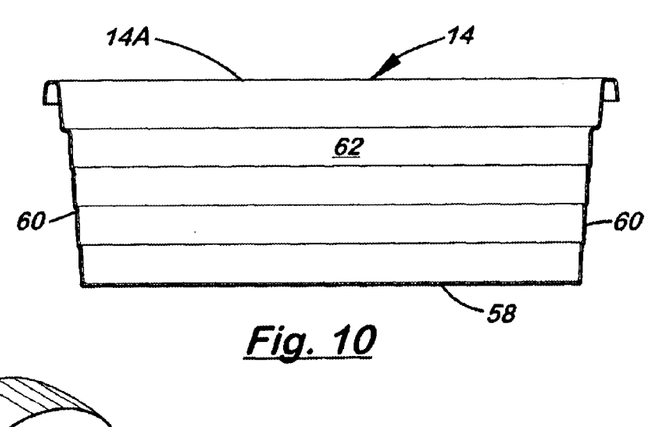
FIG. 10 is an enlarged cross-sectional view of the storage container body and the top cover pivotally mounted thereon, without the carrier rack being shown on the top cover.
Figure 11:
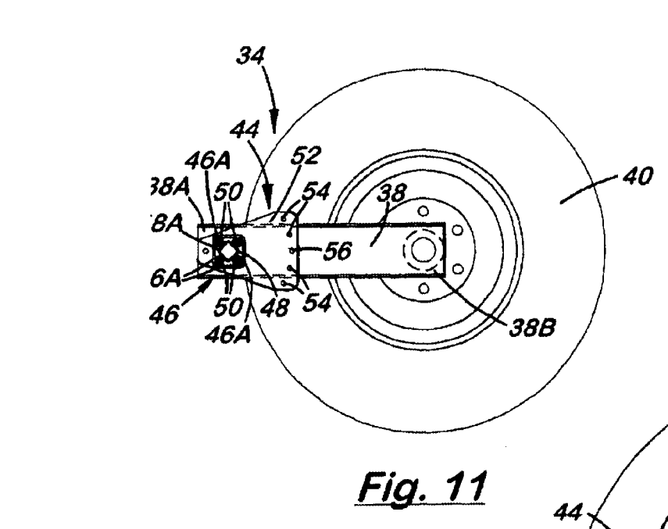
FIG. 11 is an enlarged side elevational and partially cross-sectional view of one of the wheel subassemblies of the mobile chassis as seen along line 11—11 of FIG. 3 so as to expose the resilient torsion bar suspension subassembly associated with the one wheel subassembly.
Figure 12:
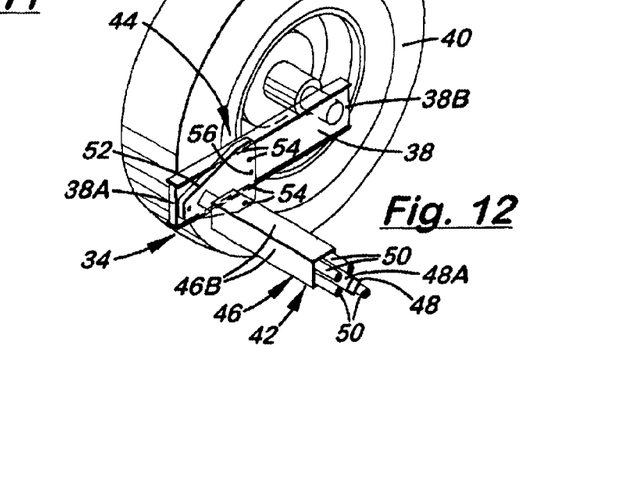
FIG. 12 is a perspective view of the portion of the wheel subassembly and torsion bar suspension subassembly of FIG. 11.

More particularly, the suspension subassembly 42 includes a transverse tubular torsion member 46, an elongated rigid bar member 48 and a plurality of elongated impact absorbing members 50. The tubular torsion member 46 is attached to and extends transversely of the frame structure 20 intermediately between the front and rear ends 20A, 20B of the frame structure 20. Also, the tubular torsion member 46 has opposite ends 46A and a plurality of wall portions 46B angularly displaced from one another. The rigid bar member 48 extends through the tubular torsion member 46 and has opposite ends 48A extending from the opposite ends 46A of the tubular torsion member 46. Also, the rigid bar member 48 has a plurality of longitudinal side portions 48B angularly displaced from one another and extending between the opposite ends 48A of the bar member 48. The elongated impact absorbing members 50 each is made of a yieldably resilient deformable material and extends through the tubular torsion member 46 and between the tubular torsion member 46 and a respective one of the longitudinal side portions 48B of the bar member 48 such that the wall portions 46B of the tubular torsion member 46 are spaced radially outwardly from and in a non-contacting relationship with the side portions 48B of the bar member 48. The impact absorbing members 50 are thereby adapted to resiliently and yieldably resist rotation of the bar member 48 relative to the tubular torsion member 46 due to impacts received by the wheels 40 of the wheel assemblies 34. The bar member 48 specifically is rectangular in cross-section and each of the longitudinal-side portions 48B is a substantially flat side surface of the bar member 48.

The frame structure height adjustment subassembly 44 couples the opposite ends 48A of the bar member 48 to the wheel subassemblies 34. The frame structure height adjustment subassembly 44 includes a pair of height adjustment plates 52 each disposed adjacent to one of the swing arms 38 of the wheel assemblies 34. The adjustment plates 52 extend transversely of and are respectively rigidly attached to the opposite ends 48A of the bar member 48 of the suspension subassembly 42. The adjustment plates 52 also are respectively rotatably connected to the one ends 38A of the swing arms 38 at locations offset from where the adjustment plates 52 are attached to the bar member 48. Also, the adjustment subassembly 44 includes means in the form of holes 54 in the plates 52 and pins 56 insertable through selected pairs of the holes 54 for releasably interengaging each of the swing arms 38 with one of the height adjustment plates 52 at selected one of a plurality of vertical positions for placing the frame structure 20 at a selected height relative to the wheels 40 of the wheel assemblies 34 and the ground surface.

Referring to FIGS. 1 and 6–10, the container body 14 includes a bottom wall 58, opposite side walls 60 and front and rear end walls 62, 64. The bottom wall 58 has opposite side edges and front and rear edges. The opposite side walls 60 are connected to and extend upwardly from the opposite side edges of the bottom wall 58. The front and rear end walls 62, 64 are connected to and extend upwardly from the front and rear edges of the bottom wall 58 and extend between and are connected to the side walls 60. The bottom wall 58, opposite side walls 60 and front and rear end walls 62, 64 together define a storage cavity 66 in the container body 14 and the open top 14A thereof. Also, the container body 14 further includes a pair of opposite wheel wells 68 recessed into the bottom wall 58 and opposite side walls 60 of the container body 14. The wheels 40 of the wheel assemblies 34 are at least partially disposed in the wheel wells 68 of the container body 14. The wheel wells 68 permit a reduction in the overall width of the trailer assembly 10 so that it can be pulled behind an ATV, as well as a car or pickup truck. The top cover 16 preferably is pivotally hinged along an upper edge of one of side walls 60 of the container body 14 and latchable along an upper edge of the other of the side walls 60 of the container body 14.

Figure 13:
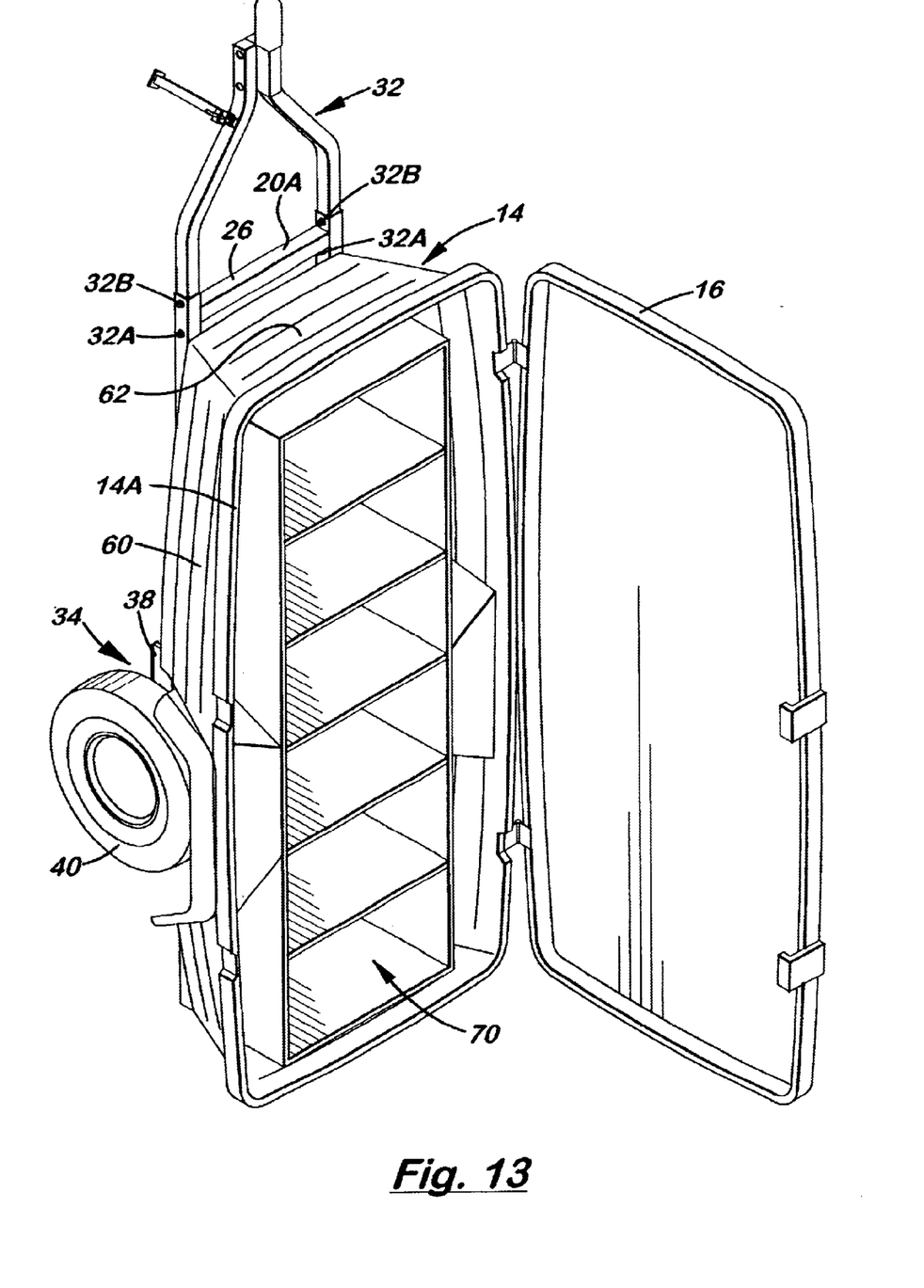
FIG. 13 is a perspective view of the trailer assembly disposed in an upright storage position with the top cover opened to expose a multi-compartment storage unit inserted in the storage container body of the trailer assembly.

Referring to FIG. 13, the assembly 10 may also include an arrangement or unit of storage shelves 70 disposable in the storage cavity 66 between the front and rear end walls 62, 64 of the compartment body 14 such that when the trailer assembly 10 is placed in a vertical orientation the unit of storage shelves 70 are disposed in horizontal orientations and one above the next.

Figure 15:
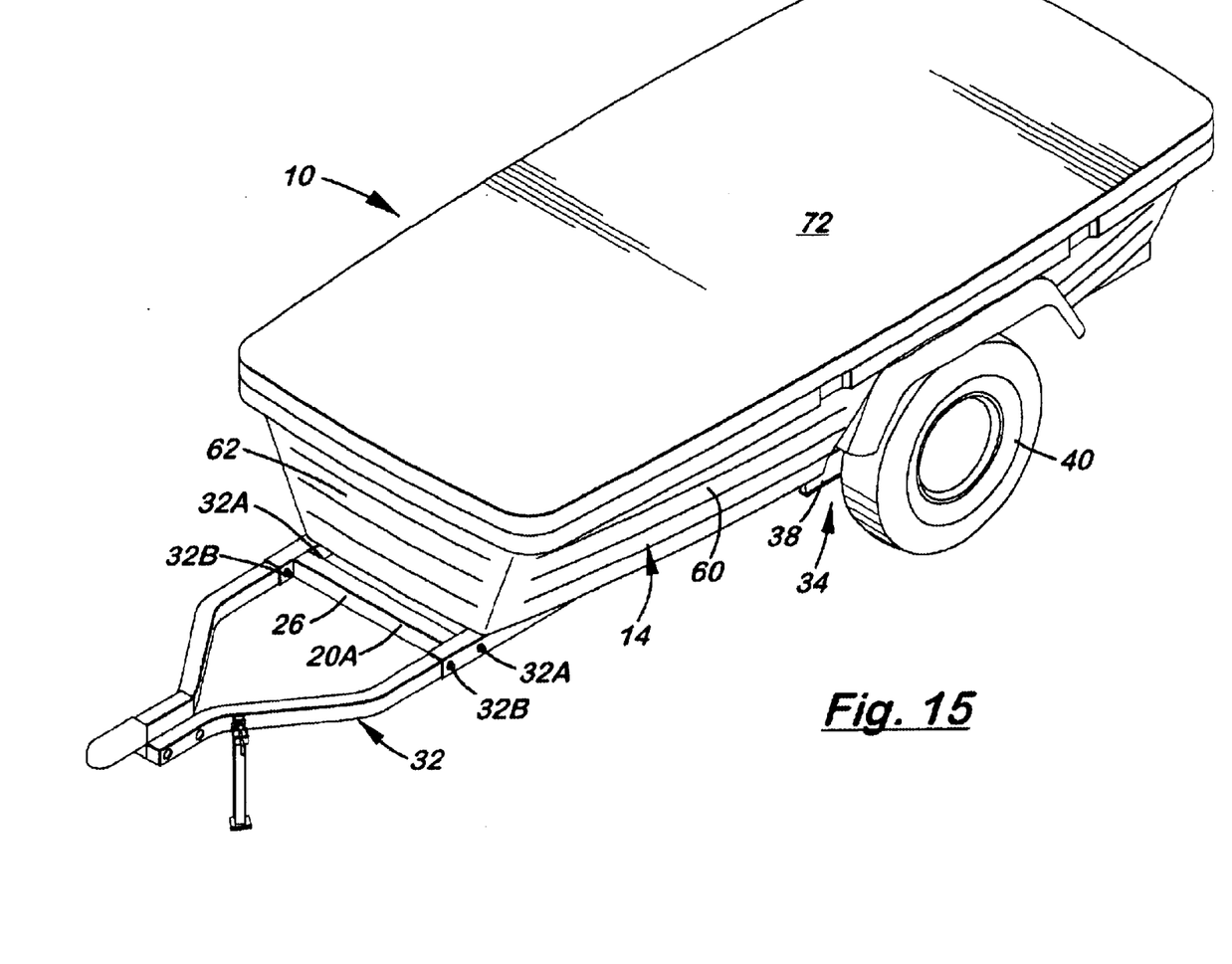
FIG. 15 is a perspective view of the trailer assembly having an alternative top cover mounted on the storage container body of the trailer assembly.

Referring to FIG. 15, instead of a hinged top cover 16 the trailer assembly 10 can also employ a flexible cover 72 fittable and lockable onto the open top 14A of the trailer body 10 for closing the same.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A load hauling trailer assembly hitchable behind an all-terrain vehicle, comprising:
   (a) a towable mobile chassis including
      (i) a longitudinally-extending frame structure having front and rear ends and opposite lateral sides,
      (ii) a pair of wheel subassemblies each having a swing arm and a wheel, said swing arm of each wheel assembly having opposite ends,
      (iii) means mounted to and extending transversely of said frame structure and having opposite ends for mounting said wheel subassemblies to said frame structure intermediately between said front and rear ends and outwardly of said opposite lateral sides of said frame structure, said swing arm of each of said wheel subassemblies being coupled at one of said opposite ends of said swing arm to said means for mounting said wheel subassemblies, said wheel of each of said wheel subassemblies being rotatably mounted to the other of said opposite ends of said swing arm of one of said wheel subassemblies, and
      (iv) a frame structure height adjustment subassembly coupling said swing arms of said wheel subassemblies to said opposite ends of said means for mounting said wheel subassemblies, said frame structure height adjustment subassembly including a pair of height adjustment plates each disposed adjacent to one of said swing arms of said wheel subassemblies and extending transversely of and rigidly attached at a first location on said adjustment plate to one of said opposite ends of said means for mounting said wheel subassemblies, each of said adjustment plates also rotatably connected at a second location offset from said first location thereon to said one end of a respective one of said swing arms of said wheel subassemblies, said frame structure height adjustment subassembly also including means for releasably interengaging each of said swing arms with one of said height adjustment plates at a selected one of a plurality of vertical positions for placing said frame structure at a selected height relative to said wheels of said wheel assemblies;
   (b) a storage container body mounted on said frame structure of said mobile chassis and having an open top;
   (c) a top cover having an outer side and being mountable on said storage container body and movable between opened and closed positions relative to said open top of said storage container body; and
   (d) a carrier rack mounted on said outer side of said top cover and adapted to carry gear thereon when said top cover is mounted on said storage container body and moved to said closed position.

2. The assembly of claim 1 wherein towable mobile chassis also includes a tongue structure attached to and extending forwardly from said front end of said frame structure.

3. The assembly of claim 2 wherein said tongue structure is attached to said front end of said frame structure so as to permit pivotal movement of said tongue structure between a deployed position in which said tongue structure is disposed in a generally coplanar relationship to said frame structure and a storage position in which said tongue structure is disposed in a generally upright transverse relationship to said frame structure.

4. The assembly of claim 1 wherein said storage container body includes a bottom wall having opposite side edges and front and rear edges, a pair of opposite side walls connected to and extending upwardly from said opposite side edges of said bottom wall, and front and rear end wall connected to and extending upwardly from said front and rear edges of said bottom wall and extending between and connected to said side walls, said bottom wall, opposite side walls and front and rear end walls together defining a storage cavity in said storage container body and said open top thereof.

5. The assembly of claim 4 further comprising:
   an arrangement of storage shelves disposable in said storage cavity between said front and rear walls of said storage compartment body such that when said assembly is placed in a vertical orientation with said chassis resting on a support surface and extending upwardly generally perpendicular to the support surface said storage shelves are disposed in horizontal orientations.

6. The assembly of claim 4 wherein said storage container body further includes a pair of opposite wheel wells recessed into said bottom wall and opposite side walls of said storage container body, said wheels of said wheel subassemblies being at least partially disposed in said wheel wells of said storage container body.

7. The assembly of claim 1 wherein said top cover is pivotally hinged along an upper edge of one of said side walls of said storage container body and latchable along an upper edge of the other of said side walls of said storage container body.

8. A load hauling trailer assembly hitchable behind an all-terrain vehicle, comprising:
   (a) a towable mobile chassis including
      (i) a longitudinally-extending frame structure having front and rear ends and opposite lateral sides,
      (ii) a pair of wheel subassemblies each having a swing arm and a wheel, said swing arm of each wheel assembly having opposite ends, and
      (iii) means mounted to and extending transversely of said frame structure for mounting said wheel subassemblies to said frame structure intermediately between said front and rear ends and outwardly of said opposite lateral sides of said frame structure, said swing arm of each of said wheel subassemblies being coupled at one of said opposite ends of said swing arm to said means for mounting said wheel subassemblies, said wheel of each of said wheel subassemblies being rotatably mounted to the other of said opposite ends of said swing arm of one of said wheel subassemblies;
   (b) a storage container body mounted on said frame structure of said mobile chassis and having an open top;
   (c) a top cover having an outer side and being mountable on said storage container body and movable between opened and closed positions relative to said open top of said storage container body; and
   (d) a carrier rack mounted on said outer side of said top cover and adapted to carry gear thereon when said top cover is mounted on said storage container body and moved to said closed position;
   (e) said means for mounting said wheel subassemblies to said frame structure including a suspension subassembly adapted to absorb impacts received by said wheels of said wheel subassemblies, said suspension subassembly including
      (i) a transverse tubular torsion member have a pair of opposite ends and a plurality of wall portions angularly displaced from one another, said tubular torsion member being attached to and extending transversely of said frame structure intermediately between said front and rear ends of said frame structure,
      (ii) an elongated rigid bar member extending through the tubular torsion member and having opposite ends extending from said opposite ends of said tubular torsion member and a plurality of longitudinal side portions angularly displaced from one another and extending between said opposite ends of said bar member, and
      (iii) a plurality of elongated impact absorbing members made of a yieldably resilient deformable material, each impact absorbing member extending through said tubular torsion member and between said tubular torsion member and a respective one of said longitudinal side portions of said bar member such that said walls of said tubular torsion member are spaced radially outwardly from and in a non-contacting relationship with said side portions of said bar member and said impact absorbing members are thereby adapted to resiliently and yieldably resist rotation of said bar member relative to said tubular torsion member due to impacts received by said wheel subassemblies;
   (f) said means for mounting said wheel subassemblies to said frame structure also including a frame structure height adjustment subassembly coupling said opposite ends of said bar member to said swing arms of said wheel subassemblies, said frame structure height adjustment subassembly including
      (i) a pair of height adjustment plates each disposed adjacent to one of said swing arms of said wheel subassemblies and extending transversely of and rigidly attached at a first location on said adjustment plate to one of said opposite ends of said bar member of said suspension subassembly, each of said adjustment plates also rotatably connected at a second location offset from said first location thereon to said one end of a respective one of said swing arms of said wheel subassemblies, and
      (ii) means for releasably interengaging each of said swing arms with one of said height adjustment plates at a selected one of a plurality of vertical positions for placing said frame structure at a selected height relative to said wheels of said wheel subassemblies.

9. The assembly of claim 8 wherein said bar member is rectangular in cross-section and each of said longitudinal side portions is a substantially flat side surface of said rectangular bar member.

10. A load hauling trailer assembly hitchable behind an all-terrain vehicle, comprising:
   (a) a towable mobile chassis including a longitudinally-extending frame structure having front and rear ends and opposite lateral sides, a pair of wheel subassemblies, and means mounted to and extending transversely of said frame structure for mounting said wheel subassemblies to said frame structure intermediately between said front and rear ends and outwardly of said opposite lateral sides of said frame structure, said means for mounting said wheel subassemblies to said frame structure including a suspension subassembly having opposite ends and being adapted to absorb impacts received by said wheel subassemblies and a frame structure height adjustment subassembly coupling said opposite ends of said suspension subassembly to said wheel subassemblies, said each of said wheel subassemblies including a swing arm and a wheel, said swing arm of each of said wheel subassemblies having opposite ends and being coupled at one of said opposite ends of said swing arm to said means for mounting said wheel subassemblies to said frame structure, said wheel of each of said wheel subassemblies being rotatable mounted to the other of said opposite ends of one of said swing arms of said wheel subassemblies;
   (b) a storage container body mounted on said frame structure of said mobile chassis and having an open top; and
   (c) a top cover having an outer side and being mountable on said storage container body and movable between opened and closed positions relative to said open top of said storage container body;
   (d) said frame structure height adjustment subassembly including (i) a pair of height adjustment plates each disposed adjacent to one of said swing arms of said wheel assemblies and extending transversely of and rigidly attached at a first location on said adjustment plate to one of said opposite ends of said suspension subassembly, each of said adjustment plates also rotatably connected at a second location offset from said first location thereon to said one end of a respective one of said swing arms of said wheel subassemblies, and (ii) means for releasably interengaging each of said swing arms with one of said height adjustment plates at selected one of a plurality of vertical positions for placing said frame structure at a selected height relative to said wheels of said wheel subassemblies.

11. The assembly of claim 10 wherein towable mobile chassis also includes a tongue structure attached to and extending forwardly from said front end of said frame structure.

12. The assembly of claim 11 wherein said tongue structure is attached to said front end of said frame structure so as to permit pivotal movement of said tongue structure between a deployed position in which said tongue structure is disposed in a generally coplanar relationship to said frame structure and a storage position in which said tongue structure is disposed in a generally upright transverse relationship to said frame structure.

13. The assembly of claim 10 wherein said storage container body includes a bottom wall having opposite side edges and front and rear edges, a pair of opposite side walls connected to and extending upwardly from said opposite side edges of said bottom wall, and front and rear end wall connected to and extending upwardly from said front and rear edges of said bottom wall and extending between and connected to said side walls, said bottom wall, opposite side walls and front and rear walls together defining a storage cavity in said storage container body and said open top thereof.

14. The assembly of claim 13 further comprising:

an arrangement of storage shelves disposable in said storage cavity between said front and rear walls of said storage compartment body such that when said assembly is placed in a vertical orientation with said chassis resting on a support surface and extending upwardly generally perpendicular to the support surface said storage shelves are disposed in horizontal orientations.

15. The assembly of claim 13 wherein said storage container body further includes a pair of opposite wheel wells recessed into said bottom wall and opposite side walls of storage container body, said wheels of said wheel subassemblies being at least partially disposed in said wheel wells of said storage container body.

16. The assembly of claim 13 wherein said top cover is pivotally hinged along an upper edge of one of said side walls of said storage container body and latchable along an upper edge of the other of said side walls of said storage container body.

17. A load hauling trailer assembly hitchable behind an all-terrain vehicle, comprising:

(a) a towable mobile chassis including a longitudinally-extending frame structure having front and rear ends and opposite lateral sides, a pair of wheel subassemblies, and means mounted to and extending transversely of said frame structure for mounting said wheel subassemblies to said frame structure intermediately between said front and rear ends and outwardly of said opposite lateral sides of said frame structure, said means for mounting said wheel subassemblies to said frame structure including a suspension subassembly having opposite ends and being adapted to absorb impacts received by said wheel subassemblies and a frame structure height adjustment subassembly coupling said opposite ends of suspension subassembly to said wheel subassemblies;

(b) a storage container body mounted on said mobile chassis and having an open top; and (c) a top cover having an outer side and being mountable on said storage container body and movable between opened and closed positions relative to said open top of said storage container body;

(d) said suspension subassembly including (i) a transverse tubular torsion member have a pair of opposite ends and a plurality of wall portions angularly displaced from one another, said tubular torsion member being attached to and extending transversely of said frame structure intermediately between said front and rear ends of said frame structure, (ii) an elongated rigid bar member extending through the tubular torsion member and having opposite ends extending from said opposite ends of said tubular torsion member and a plurality of longitudinal side portions angularly displaced from one another and extending between said opposite ends of said bar member, and (iii) a plurality of elongated impact absorbing members made of a yieldably resilient deformable material, each impact absorbing member extending through said tubular torsion member and between said tubular torsion member and a respective one of said longitudinal side portions of said bar member such that said walls of said tubular torsion member are spaced radially outwardly from and in a non-contacting relationship with said side portions of said bar member and said impact absorbing members are thereby adapted to resiliently and yieldably resist rotation of said bar member relative to said tubular torsion member due to impacts received by said wheel subassemblies;

(e) said frame structure height adjustment subassembly including (i) a pair of height adjustment plates each disposed adjacent to one of said swing arms of said wheel subassemblies and extending transversely of and rigidly attached at a first location on said adjustment plate to one of said opposite ends of said bar member of said suspension subassembly, each of said adjustment plates also rotatably connected at a second location offset from said first location thereon to said one end of a respective one of said swing arms of said wheel subassemblies, and (ii) means for releasably interengaging each of said swing arms with one of said height adjustment plates at a selected one of a plurality of vertical positions for placing said frame structure at a selected height relative to said wheels of said wheel subassemblies.

18. The assembly of claim 17 wherein said bar member is rectangular in cross-section and each of said longitudinal side portions is a substantially flat side surface of said rectangular bar member.

\* \* \* \* \*